(12) United States Patent
Hosoi et al.

(10) Patent No.: US 10,152,992 B1
(45) Date of Patent: Dec. 11, 2018

(54) LIGHT SOURCE UNIT AND THERMALLY-ASSISTED MAGNETIC HEAD

(71) Applicant: SAE Magnetics (H.K.) Ltd., Hong Kong (CN)

(72) Inventors: Ryo Hosoi, Hong Kong (CN); Seiichi Takayama, Hong Kong (CN); Takashi Honda, Hong Kong (CN)

(73) Assignee: SAE MAGNETICS (H.K.) LTD., Hong Kong (CN)

( * ) Notice: Subject to any disclaimer, the term of this patent is extended or adjusted under 35 U.S.C. 154(b) by 0 days.

(21) Appl. No.: 15/892,771

(22) Filed: Feb. 9, 2018

(51) Int. Cl.
  *G11B 5/09* (2006.01)
  *G11B 5/48* (2006.01)
  *G11B 5/60* (2006.01)
  *G11B 5/00* (2006.01)

(52) U.S. Cl.
  CPC .......... *G11B 5/4866* (2013.01); *G11B 5/6082* (2013.01); *G11B 2005/0021* (2013.01)

(58) Field of Classification Search
  None
  See application file for complete search history.

(56) References Cited

U.S. PATENT DOCUMENTS

| | | | | |
|---|---|---|---|---|
| 5,517,479 A | * | 5/1996 | Nakanishi | G11B 7/094 257/80 |
| 5,905,750 A | * | 5/1999 | Lebby | H01S 5/02296 369/121 |
| 5,912,872 A | * | 6/1999 | Feldman | G11B 7/123 369/103 |
| 6,631,302 B1 | * | 10/2003 | Wilson | G11B 7/22 369/112.01 |
| 2002/0163865 A1 | * | 11/2002 | Zimmer | G11B 7/22 369/44.14 |
| 2014/0105538 A1 | * | 4/2014 | Toyohara | H01S 5/02272 385/14 |
| 2017/0054269 A1 | * | 2/2017 | Tamura | H01S 5/02248 |

* cited by examiner

*Primary Examiner* — Peter Vincent Agustin
(74) *Attorney, Agent, or Firm* — Nixon & Vanderhye PC (57) ABSTRACT

A light source unit for thermally-assisted magnetic head includes a support member and a light source attached on the support member via a solder, and the light source unit further includes a positioning structure formed between the support member and the light source for positioning the light source and the solder. The light source unit can maintain stable height control of the light source, prevent solder over flow and prevent the light source from shifting and moving during the bonding process.

20 Claims, 12 Drawing Sheets

Fig. 1a

PRIOR ART

Fig. 1b

PRIOR ART

LIGHT SOURCE UNIT AND THERMALLY-ASSISTED MAGNETIC HEAD

FIELD OF THE INVENTION

The present invention relates to a hard disk drive (HDD) with thermally-assisted magnetic heads and, more particularly, to a stable light source unit for thermally-assisted magnetic heads.

BACKGROUND OF THE INVENTION

HDDs are common information storage devices. With improvements in recording density of magnetic HDDs, there has been a demand for improving the performance of magnetic heads and magnetic recording media. In a magnetic hard disk drive, a magnetic head is embedded in a slider that flies above the surface of a magnetic recording medium.

Recently, a technology so-called thermal assisted magnetic recording (TAMR) has been proposed, and a thermal assisted magnetic head also has been put to use. The technology uses a magnetic recording medium having high coercivity. When writing data, a write magnetic field and heat are applied almost simultaneously to the area of the magnetic recording medium where to write data, so that the area rises in temperature and drops in coercivity for data writing. The area where data is written subsequently falls in temperature and rises in coercivity to increase the thermal stability of magnetization.

Figure 1A:
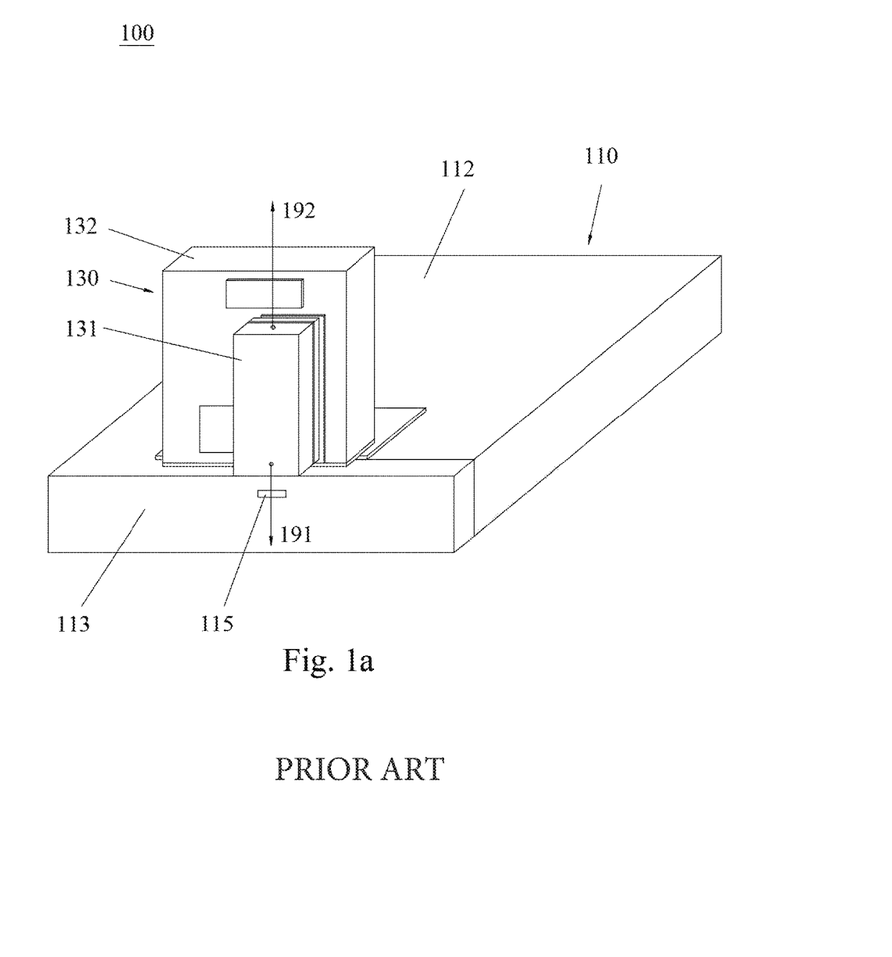
FIG. 1a is a partial exploded perspective view of a conventional thermally-assisted magnetic head.

Commonly, the heat source comes from the thermal assisted magnetic head. FIG. 1a shows a perspective view of a conventional thermal assisted magnetic head 100. The thermal assisted magnetic head 100 includes a slider body 110 having an air bearing surface (ABS) (not shown, under) processed so as to provide an appropriate flying height and a light source unit 130 mounted on the slider body 110. The slider body 110 includes a bottom surface 112 opposite the ABS, a trailing edge 113 where read and write elements 115 are embedded, and a leading edge (not shown, back) opposite the trailing edge 113. The light source unit 130 is mounted on the position where the write elements are embedded via a bonding layer. The light source unit 130 includes a light source 131 located near the write element and a support member 132 for supporting the light source 131. The support member 132 is bonded to the slider body 110 by using a solder layer, for example. The light source 131 emits a laser light to a portion of the magnetic recording medium, which reduces the medium's coercivity. After that, writing is performed by applying write magnetic field to the heated portion; therefore the writing operation is facilitated.

Figure 1B:
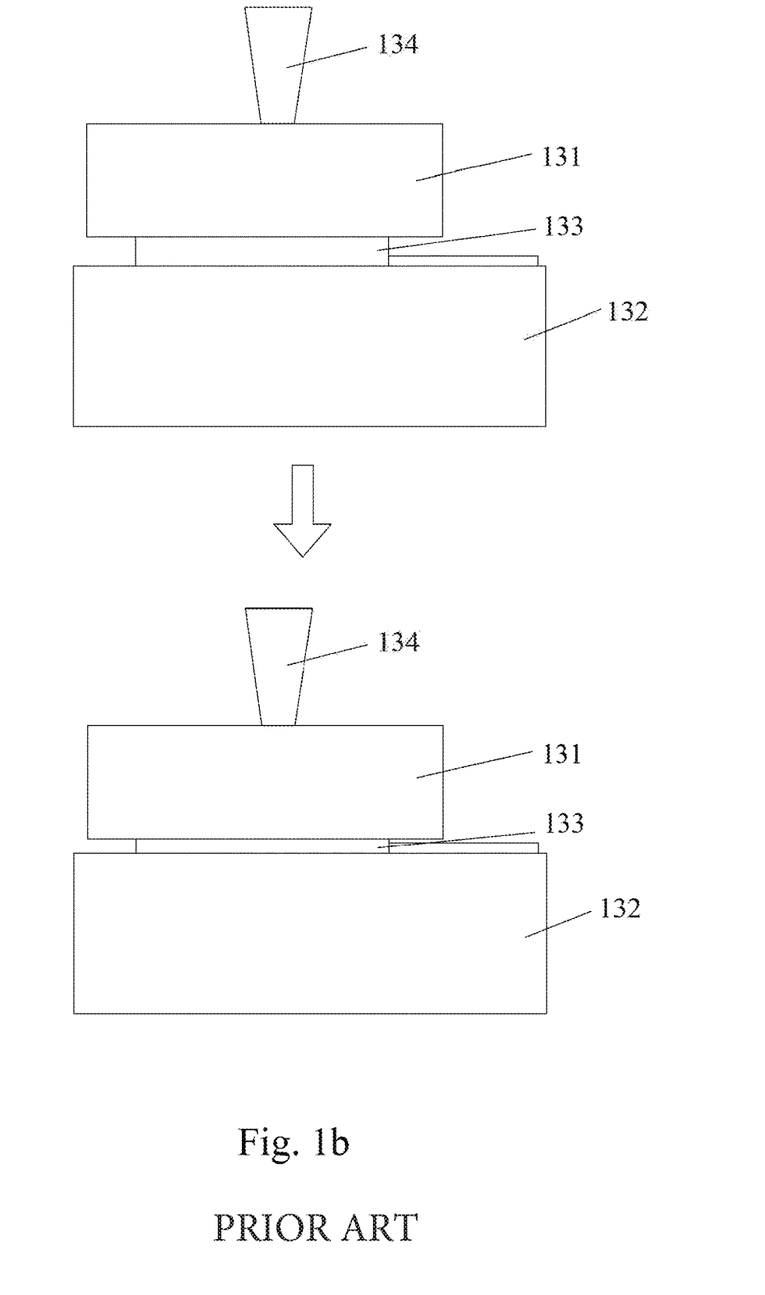
FIG. 1b shows simplified flowchart of bonding a conventional light source unit.

As shown in FIG. 1b, the light source 131 is bonded to the support member 132 via a solder 133. First, the light source 131 is placed on the support member 132 with a load 134, and then, the support member 132 is heated to melt the solder, after the solder is cooled down, the light source 131 is bonded on the support member to form a light source unit. However, such a structure of the light source unit has following drawbacks: (1) the distance between the light source 131 and the support member 132 are unstable; (2) the melted solder may over flow from the margin of the bonding area to cause electrical short problem; (3) position of the light source 131 will shift when the solder is melting during the bonding process, thus the gap between the end of the light source 131 and the top surface of the slider body is unstable, which damages the performance of the TAMR heads.

Thus, it is desired to provide an improved light source unit and a thermally-assisted magnetic head to overcome the above-mentioned drawbacks.

SUMMARY OF THE INVENTION

One objective of the present invention is to provide a light source unit, which can maintain stable height control of the light source, prevent solder over flow and prevent the light source from shifting and moving during the bonding process.

Another objective of the present invention is to provide a thermally-assisted magnetic head, which can maintain stable height control of the light source, prevent solder over flow and prevent the light source from shifting and moving during the bonding process.

One more objective of the present invention is to provide a manufacturing method of a light source unit for thermally-assisted magnetic head, which can maintain stable height control of the light source, prevent solder over flow and prevent the light source from shifting and moving during the bonding process.

To achieve above objectives, a light source unit for thermally-assisted magnetic head includes a support member and a light source attached on the support member via a solder, and the light source unit further includes a positioning structure formed between the support member and the light source for positioning the light source and the solder.

Preferably, the positioning structure includes at least one spacer formed on a bonding area of the support member, and the spacer has the same height with the solder.

Preferably, the spacer has a length along a width direction of the bonding area of the support member.

Preferably, the spacer has a length along a length direction of the bonding area of the support member.

As another embodiment, the positioning structure includes at least one cavity formed on a bonding area of the support member, and the solder is received in the cavity.

Preferably, the cavity has the same height with the solder.

Preferably, the light source is contacted with a periphery of the cavity.

Preferably, two separated cavities are formed on the bonding area of the support member.

Accordingly, a thermally-assisted magnetic head includes a slider body and the light source unit attached on a surface of the slider body, the light source unit includes a support member and a light source attached on the support member via a solder, and the light source unit further includes a positioning structure formed between the support member and the light source for positioning the light source and the solder.

Accordingly, a manufacturing method of a light source unit for thermally-assisted magnetic head includes providing a support member; forming a positioning structure on a bonding area of the support member; and attaching a light source on the support member via a solder, with the positioning structure between the light source and the support member.

In comparison with the prior art, the light source unit further includes a positioning structure formed between the support member and the light source for positioning the light source and the solder, due to the positioning structure, the position of the light source is stable during the bonding process, and the solder is prevented from over flowing on the margins of the light source and the support member to reduce the potential possibility of electrical short.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Various preferred embodiments of the invention will now be described with reference to the figures, wherein like reference numerals designate similar parts throughout the various views. As indicated above, the invention is directed to an improved light source unit with a positioning structure, which can maintain stable height control of the light source, prevent solder over flow and prevent the light source from shifting and moving during the bonding process.

Figure 2:
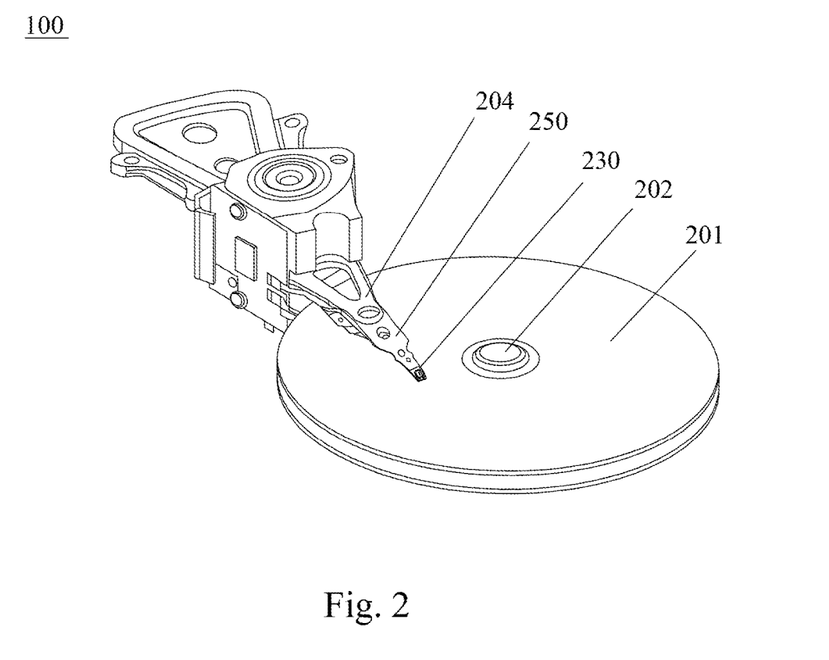
FIG. 2 is a perspective view of a hard disk drive with thermally-assisted magnetic heads according to one embodiment of the present invention.

FIG. 2 is a perspective view of the hard disk drive of the present invention. As shown, a hard disk drive 200 contains a number of rotatable magnetic disks 201 attached to a spindle motor 202, a set of drive arms 204 and HGAs 250 mounted on the ends of the drive arms 204. Typically, a VCM is provided for controlling the motion of the drive arm 204.

Figure 3:
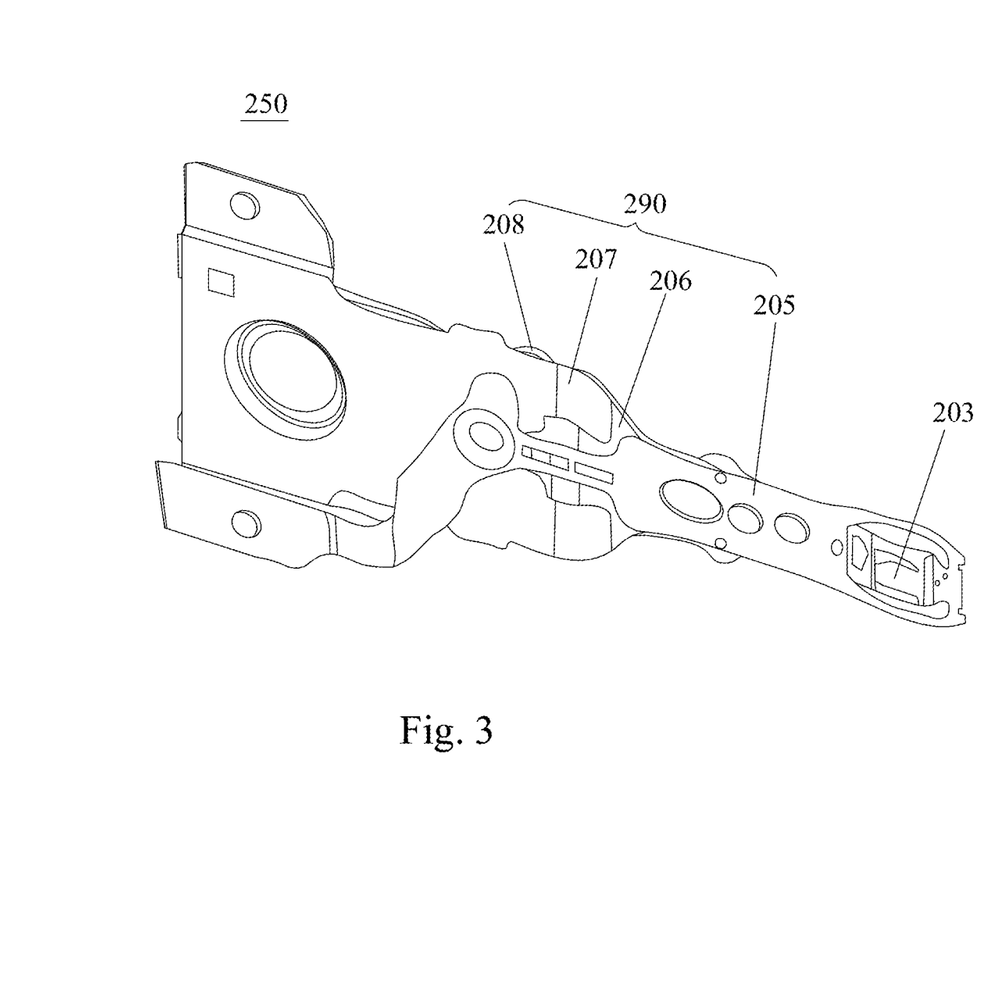
FIG. 3 is a perspective view of a head gimbal assembly with a thermally-assisted magnetic head according to one embodiment of the present invention.

Referring to FIG. 3, the HGA 250 contains a thermally-assisted magnetic head 230 and a suspension 290 for supporting the thermally-assisted magnetic head 230. The suspension 290 includes a load beam 206, a base plate 208, a hinge 207 and a flexure 205, all of which are assembled with each other. The hinge 207 has a mounting hole (not shown) formed thereon to assemble the hinge 207 to the base plate 208. As the main structure of the HGA 250 is known to the persons skilled in the art, thus is omitted here. Specifically, the thermally assisted head 230 is carried on the flexure 205.

Figure 4:
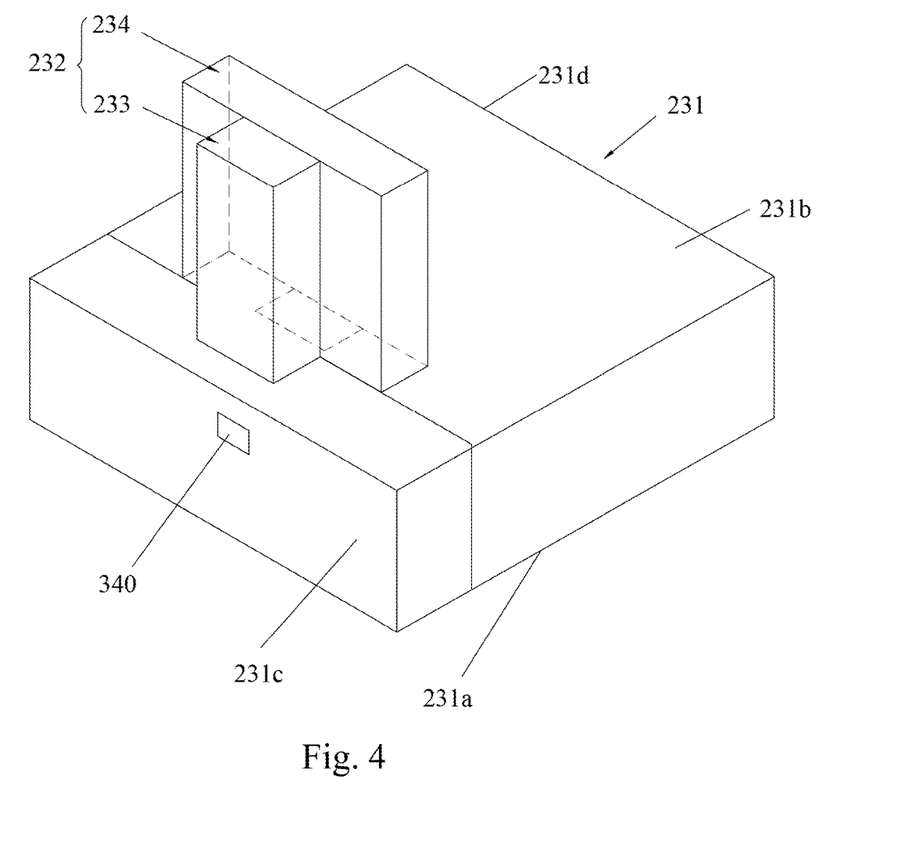
FIG. 4 is a perspective view of a thermally-assisted magnetic head according to one embodiment of the present invention.

Referring to FIG. 4, the thermally-assisted magnetic head 230 according to the present invention is illustrated. The thermally-assisted magnetic head 230 includes a slider body 231 and a light source unit 232 formed on the slider body 231 for thermally assisted magnetic recording. The light source unit 232 includes a light source 233 and a support member 234 for supporting the light source 233. In the present embodiment, the slider body 231, the light source 233, and the support member 234 are generally rectangular shaped.

As shown, the slider body 231 has an ABS 231a, a bottom surface 231b opposite to the ABS 231a, a trailing edge 231c, a leading edge 231d opposite to the trailing edge 231c, and two side surfaces (not labeled). The ABS 231a facing to the disk is processed so as to provide an appropriate flying height, and a thermally-assisted magnetic head section 340 is embedded in the trailing edge 231c. The trailing edge 231c has multiple bonding pads (not shown) to connect with a suspension 290 of the HGA 250. Specifically, the light source unit 232 is mounted on the bottom surface 231b, for emitting laser light to facilitate writing.

Figure 5:
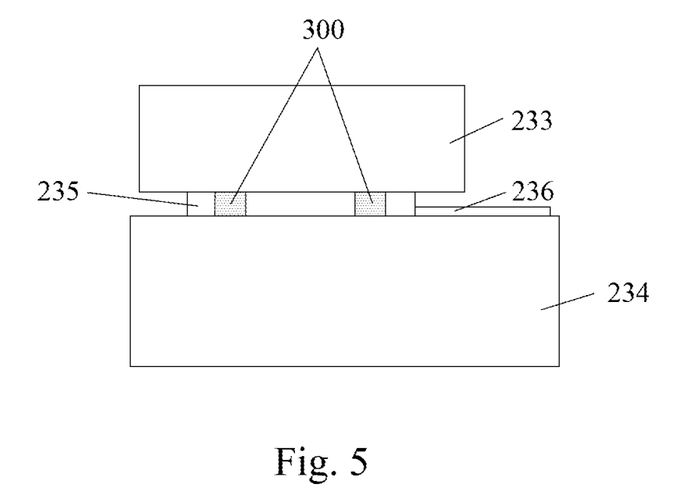
FIG. 5 is a side view of a light source unit according to one embodiment of the present invention.

As shown in FIG. 5, the light source unit 232 includes the support member 234 and the light source 233 attached on the support member 234 via a solder 235. Preferably, the light source 233 is a laser diode which is electrically and physically connected with support member 234. Further, a circuit 236 is exposed on the bonding surface of the support member 234 and electrically connected with the solder 235.

As an improvement of the present invention, the light source unit 232 further includes a positioning structure formed between the support member 234 and the light source 233 for positioning the light source 233 and the solder 235. Due to the positioning structure, the position of the light source 233 is stable during the bonding process, and the solder 235 is prevented from over flowing on the margins of the light source 233 and the support member 234.

Figure 6:
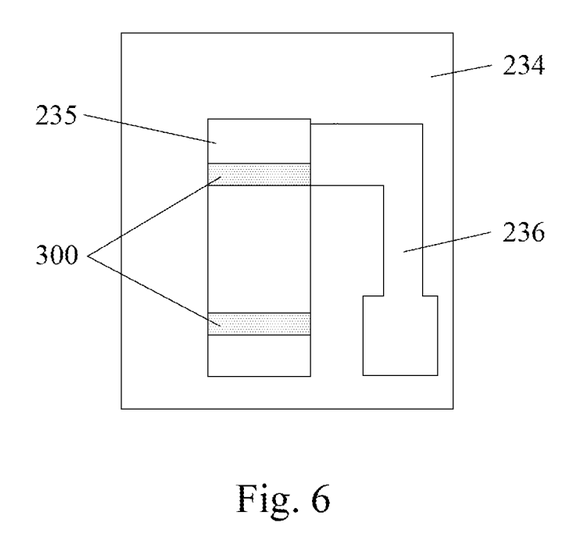
FIG. 6 is a top view of the light source unit without the light source according to a first embodiment of the present invention.
Figure 7:
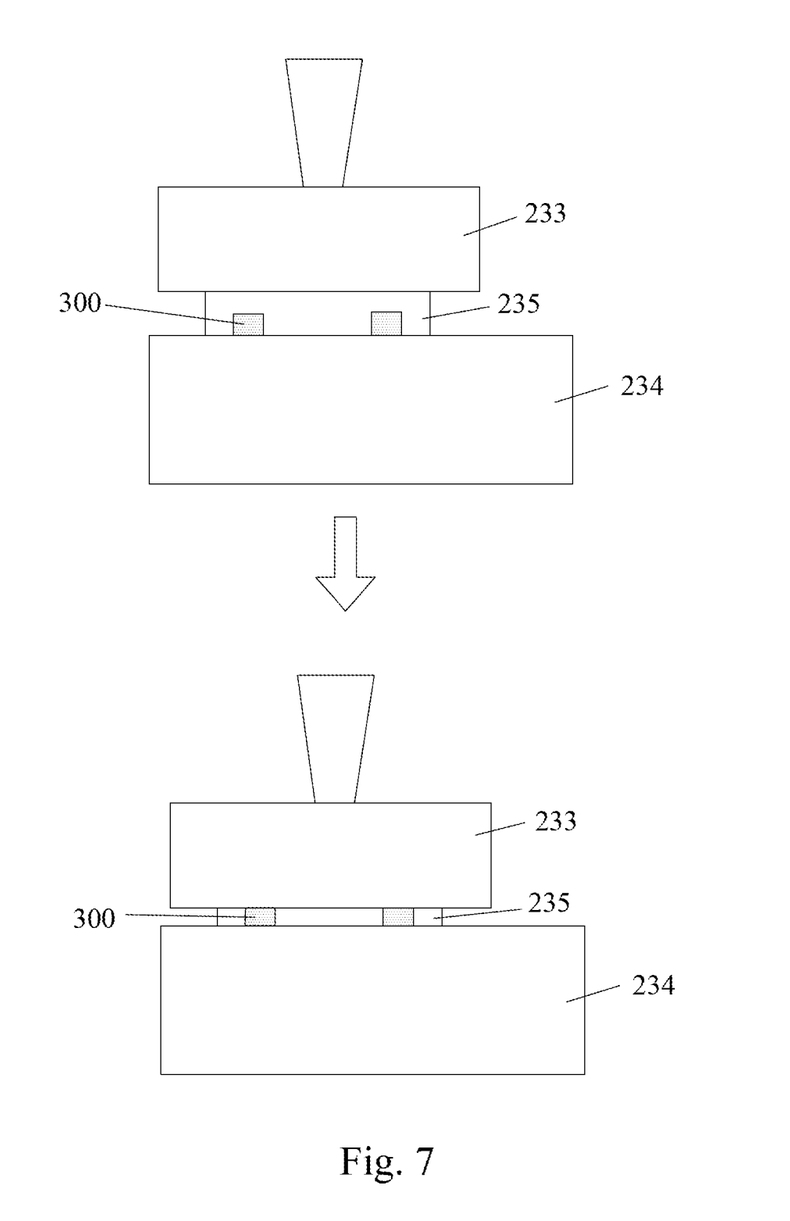
FIG. 7 shows a bonding process of the light source unit.

FIGS. 5-8c shows a set of embodiments of the light source unit 232, in these embodiments, the positioning structure is spacers 300 between the light source 233 and the support member 234. As shown in FIGS. 5-6, two spacers 300 are formed on a bonding area of the support member 234, preferably are located at the upper side and the lower side of the bonding area respectively. Specifically, the spacer 300 is rigid and will not be melted during the bonding process. Preferably, the spacer 300 is made of $SiO_2$ or $Al_2O_3$, or any material with higher melting point than the solder. The height of the spacers 300 is the same with the solder 235 after bonding, and the solder 235 is melted around the spacer 300. FIG. 7 shows the bonding process of the light source unit 232. First, the spacers 300 are formed on the bonding surface of the support member 234 in advance. Then, the light source 233 is placed on the support member 234 with a load above the spacers 300 and the solder 235, and then, the support member 234 is heated by laser to melt the solder 235, the light source 233 is applied with force continuously until the bonding surface of the light source 233 is contacted with and limited by the spacers 300; after the melted solder 235 is cooled down, the light source 233 is bonded on the support member 234 finally. Specifically, when the solder 235 is melted around the spacers 300, the height of the solder 235 is larger than that of the spacers 300; after the light source 233 is pressed down and contacted with the spacers 300, the height of the solder 235 is equal to that of the spacers 300 after the solder 235 is cooled down.

During bonding, the light source 233 will contact with the spacers 300 and be limited by the spacers 300 when it is moved down, so that the distance between the light source 233 and the support member 234 is stable. Further, the position of the light source 233 along a gap direction (from the tip of the light source 233 to the bottom surface 231b opposite to the ABS 231a) is easily to control and stable. Moreover, the melted solder will not over flow from the margins of the light source 233 and the support member 234 to reduce the potential possibility of electrical short.

Figure 8A:
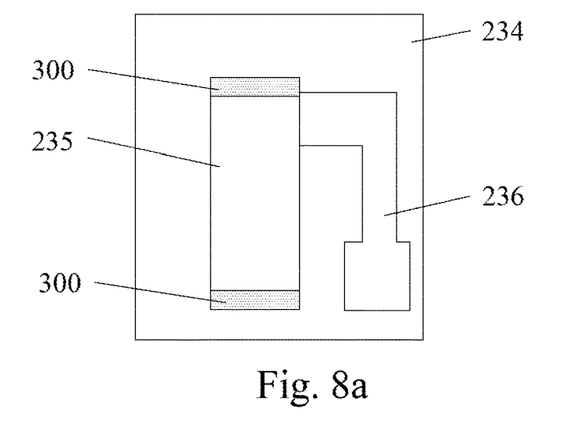
FIGS. 8a-8c shows top view of the light source unit without the light source according to different embodiments of the present invention.

In another embodiment, as shown in FIG. 8a, the main structures of the light source unit 232 is the same with the above embodiment, the differences is that, two spacers 300 are located at two end sides of the bonding area of the support member 234, and the solder 235 is formed on the area between the two spacers 300. In such a configuration, solder overflow is further prevented.

Figure 8B:
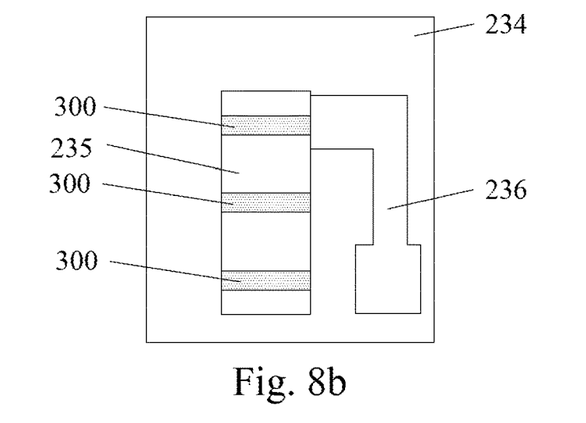

As illustrated in FIG. 8b, the difference is that, three spacers 300 are formed on the bonding area of the support member 234. The larger contacting area between the spacers 300 and the light source 233 can make the light source 233 more stable in the gap direction; further, less stress effect along the length direction after the light source is bonded thereon, which may reduce the risk of light source defect.

Figure 8C:
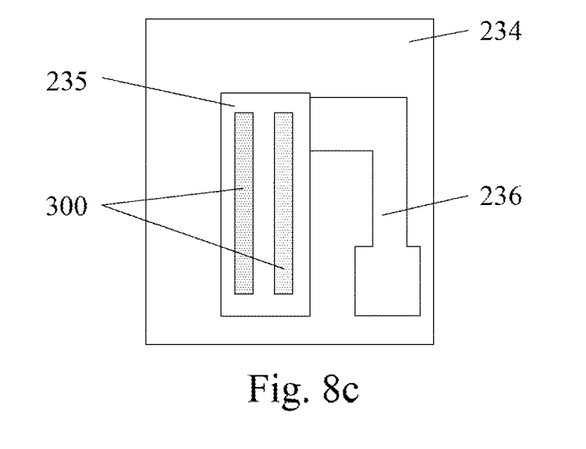

In the above embodiments of FIGS. 5, 8a-8b, the spacer 300 has a length along a width direction of the bonding area of the support member 234, while in other embodiments, for example, as shown in FIG. 8c, the spacer 300 has a length along a length direction of the bonding area of the support member 234, and two spacers 300 are formed. In such a configuration, less stress will be generated in the light source 233 along the width direction of the bonding area.

Figure 9:
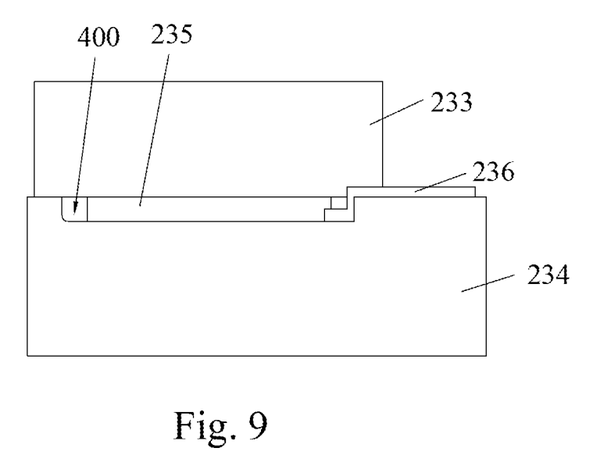
FIG. 9 is a side view of a light source unit according to another embodiment of the present invention.
Figure 10:
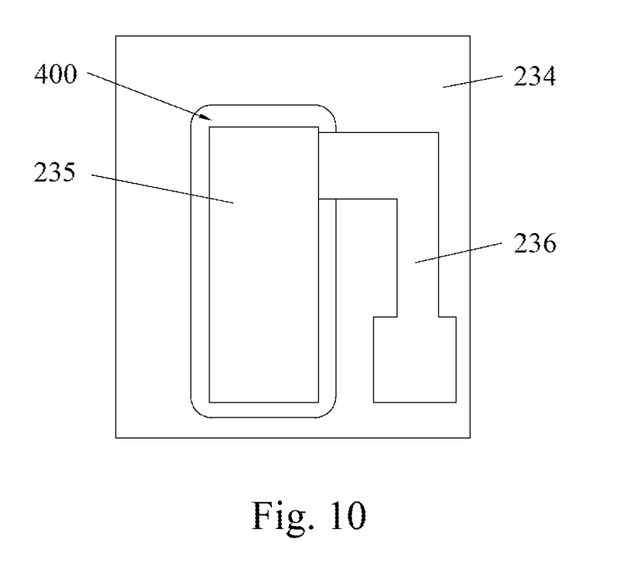
FIG. 10 is a top view of the light source unit without the light source according to another embodiment of the present invention.

As optional embodiments, the positioning structure in this present invention can be at least one cavity 400 formed on the bonding area of the support member 234, and the solder 235 is received in the cavity 400, as shown in FIGS. 9-14b. Specifically, after the bonding process, the depth of the cavity 400 is the same with the height of the solder 235, and the light source 233 is pressed against the periphery of the cavity 400. In other words, the light source 233 is limited by the higher portion of the bonding area of the support member 234, as shown in FIG. 9.

Figure 11:
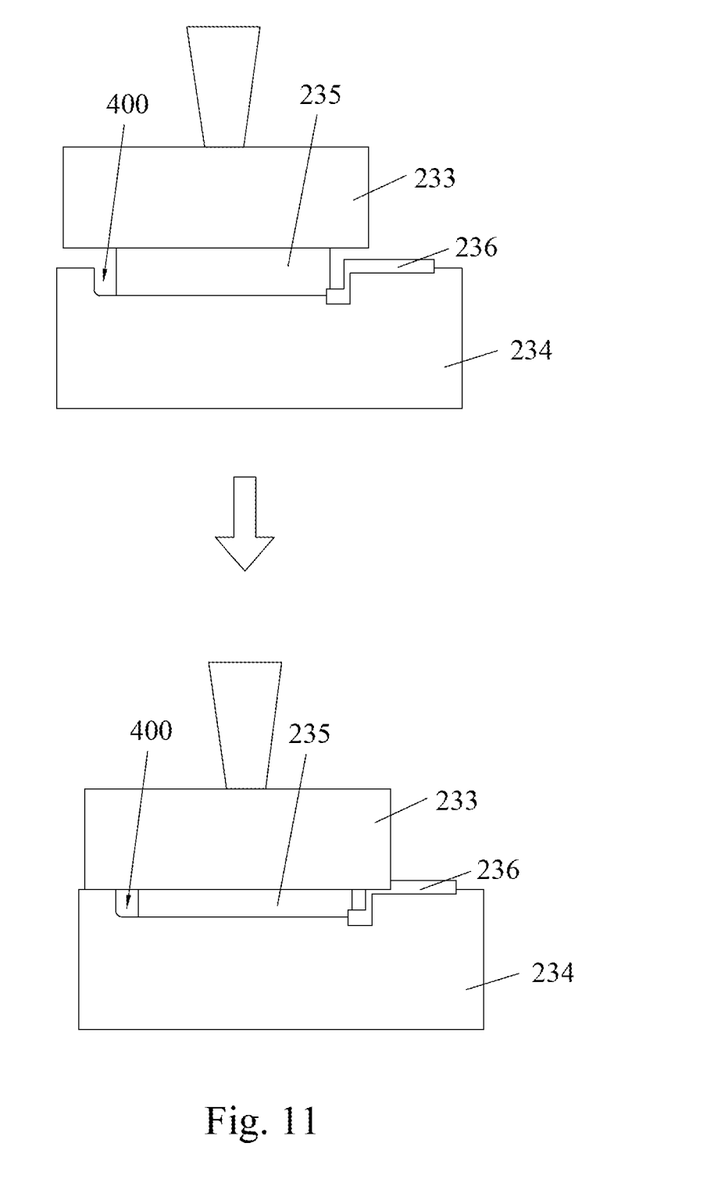
FIG. 11 shows a bonding process of the light source unit.

FIG. 11 shows the bonding process of the light source unit 232. First, the cavity 400 is formed on the bonding surface of the support member 234 in advance. Then, the light source 233 is placed on the support member 234 with weight above the solder 235, and then, the support member 234 is heated by laser to melt the solder 235, the light source 233 is applied with force continuously until the bonding surface of the light source 233 is pressed against and limited by the periphery of the cavity 400; after the melted solder 235 is cooled down, the light source 233 is bonded on the support member 234 finally.

During bonding, the light source 233 will press against the periphery of the cavity 400 and be limited by the periphery of the cavity 400, so that the distance between the light source 233 and the support member 234 is stable. Further, the position of the light source 233 along the gap direction is easily to control and stable. Moreover, the melted solder will not over flow from the margins of the light source 233 and the support member 234 to reduce the potential possibility of electrical short.

Figure 12:
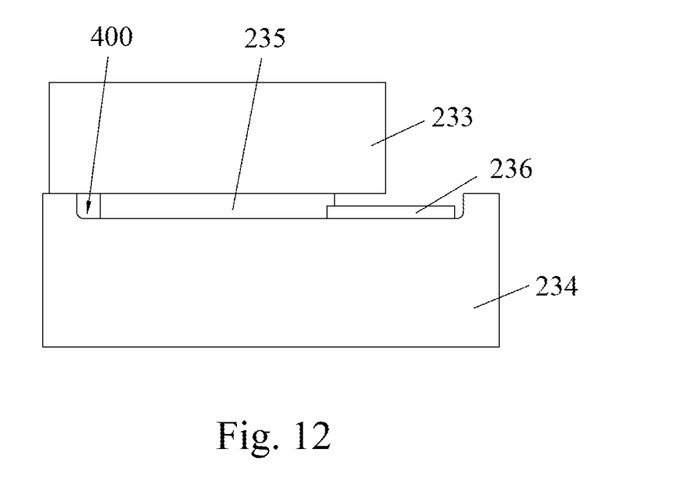
FIG. 12 is a side view of a light source unit according to another embodiment of the present invention.
Figure 13:
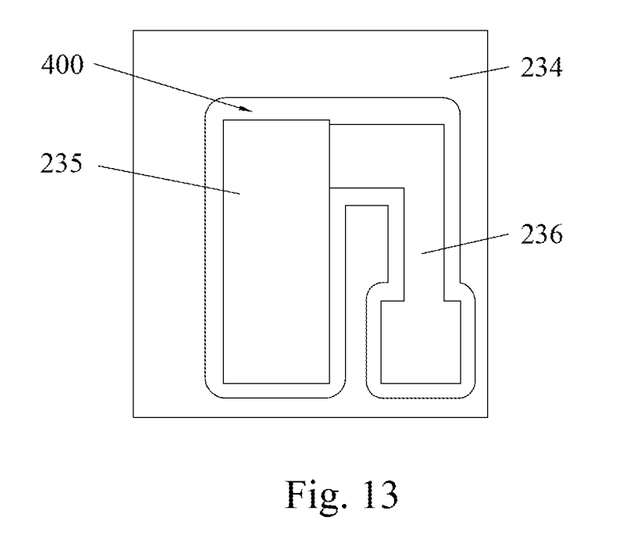
FIG. 13 is a top view of the light source unit without the light source according to another embodiment of the present invention.

As variable embodiments, the cavity 400 is extended to receive the circuit 236 that is formed on the support member 234 and connected with the light source 233, as shown in FIGS. 12 and 13.

Figure 14A:
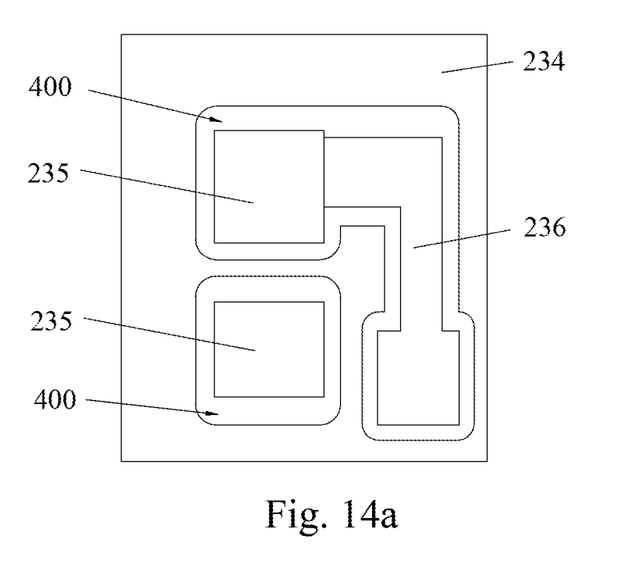
FIGS. 14a-14b show top views of the light source unit without the light source according to different embodiments of the present invention.
Figure 14B:
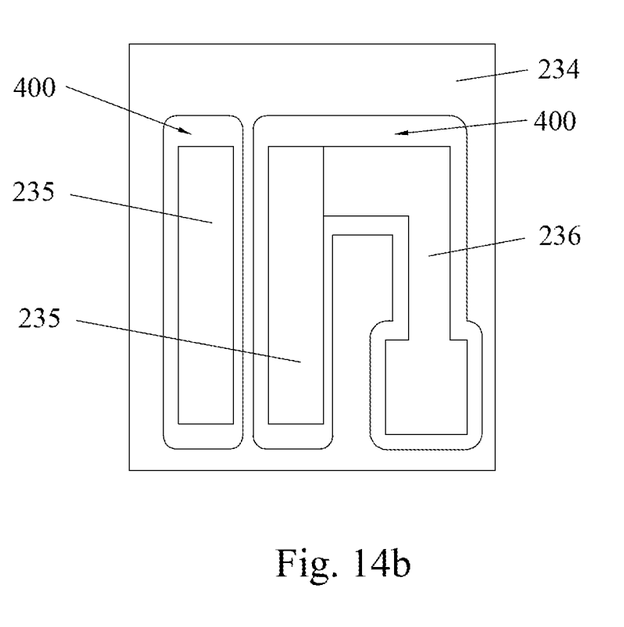

As shown in FIGS. 14a and 14b, two or more separated cavities 400 can be formed on the bonding area of the support member 234, to achieve the same advantages as the above embodiments.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A light source unit for thermally-assisted magnetic head, comprising a support member and a light source attached on the support member via a solder,
    wherein the light source unit further comprises a positioning structure formed between the support member and the light source for positioning the light source and the solder, the positioning structure comprising at least one elongated spacer in parallel to an edge of a bonding area of the support member or at least one concave cavity formed on the bonding area of the support member.

2. The light source unit according to claim 1, wherein the spacer is formed on the bonding area of the support member, and the spacer has the same height with the solder.

3. The light source unit according to claim 2, wherein the spacer is elongated along a width direction of the bonding area of the support member.

4. The light source unit according to claim 2, wherein the spacer is elongated along a length direction of the bonding area of the support member.

5. The light source unit according to claim 1, wherein the solder is received in the cavity.

6. The light source unit according to claim 5, wherein the cavity has the same height with the solder.

7. The light source unit according to claim 5, wherein the light source is in contact with a periphery of the cavity.

8. The light source unit according to claim 5, wherein two separated cavities are formed on the bonding area of the support member.

9. A thermally-assisted magnetic head, comprising a slider body and the light source unit according to claim 1 attached on a surface of the slider body.

10. The light source unit according to claim 1, wherein the positioning structure comprises two or more spacers elongated along a width direction of the bonding area of the support member.

11. A manufacturing method of a light source unit for thermally-assisted magnetic head, comprising:
    providing a support member;
    forming a positioning structure on a bonding area of the support member; and
    attaching a light source on the support member via a solder, the positioning structure being between the light source and the support member,
    wherein said forming a positioning structure on the bonding area of the support member comprises forming at least one elongated spacer in parallel to an edge of the bonding area of the support member or at least one concave cavity on the bonding area of the support member.

12. The manufacturing method according to claim 11, wherein the spacer has the same height with the solder.

13. The manufacturing method according to claim 12, wherein said attaching a light source on the support member via a solder comprises: melting the solder on the support member with a height of the solder being larger than that of the spacer, and then pressing down the light source to make it in contact with the spacer in making the height of the solder equal to that of the spacer.

14. The manufacturing method according to claim 12, wherein the spacer is elongated along a width direction of the bonding area of the support member.

15. The manufacturing method according to claim 12, wherein the spacer is elongated along a length direction of the bonding area of the support member.

16. The manufacturing method according to claim 11, wherein the solder is received in the concave cavity.

17. The manufacturing method according to claim 16, wherein the cavity has the same height with the solder.

18. The manufacturing method according to claim 11, wherein the light source is in contact with a periphery of the cavity.

19. The manufacturing method according to claim 17, wherein said attaching a light source on the support member via a solder comprises: melting the solder on the support member with a height of the solder being larger than that of the cavity, and then pressing down the light source to make it in contact with a periphery of the cavity in making the height of the solder equal to that of the cavity.

20. The manufacturing method according to claim 11, wherein said forming a positioning structure on a bonding area of the support member comprises forming two separate concave cavities on the bonding area of the support member.

* * * * *